United States Patent [19]
Bragg

[11] Patent Number: 5,910,467
[45] Date of Patent: Jun. 8, 1999

[54] SOLIDS-STABILIZED EMULSION

[75] Inventor: James R. Bragg, Houston, Tex.

[73] Assignee: Exxon Production Research Company, Houston, Tex.

[21] Appl. No.: 09/158,162

[22] Filed: Sep. 22, 1998

Related U.S. Application Data

[60] Division of application No. 09/062,167, Apr. 17, 1998, which is a continuation-in-part of application No. 08/885,507, Jun. 30, 1997

[60] Provisional application No. 60/047,620, May 23, 1997.

[51] Int. Cl.⁶ .................... C09K 3/00; C09K 7/00
[52] U.S. Cl. ............... 507/202; 507/102; 507/906; 507/925
[58] Field of Search ................ 507/102, 202, 507/906, 925; 175/69; 166/279, 305.1, 309

[56] References Cited

U.S. PATENT DOCUMENTS

| | | | |
|---|---|---|---|
| 2,241,273 | 5/1941 | Robinson et al. | 507/102 |
| 2,300,590 | 11/1942 | O'Brien | 507/102 |
| 3,149,669 | 9/1964 | Binder, Jr. et al. | 166/400 |
| 3,208,515 | 9/1965 | Meadors | 166/268 |
| 3,330,348 | 7/1967 | Hardy et al. | 166/268 |
| 3,356,138 | 12/1967 | Davis, Jr. | 507/202 |
| 3,386,514 | 6/1968 | Weber | 166/42 |
| 3,412,792 | 11/1968 | Parker et al. | 166/9 |
| 3,818,989 | 6/1974 | Christopher, Jr. et al. | 166/275 X |
| 3,980,136 | 9/1976 | Plummer et al. | 507/202 |
| 4,233,165 | 11/1980 | Salathiel et al. | 507/937 X |
| 4,274,956 | 6/1981 | Stewart | 210/638 |
| 4,505,828 | 3/1985 | Lipowski et al. | 166/267 |
| 4,780,243 | 10/1988 | Edgley et al. | 507/202 |
| 4,966,235 | 10/1990 | Gregoli et al. | 166/267 |
| 5,080,809 | 1/1992 | Stahl et al. | 252/8.554 |
| 5,294,353 | 3/1994 | Dill | 166/275 |
| 5,302,293 | 4/1994 | Kaplan et al. | 210/701 |
| 5,350,014 | 9/1994 | McKay | 166/263 |
| 5,360,558 | 11/1994 | Pakulski et al. | 507/202 |
| 5,424,285 | 6/1995 | Stacy et al. | 507/202 |
| 5,490,940 | 2/1996 | Bragg et al. | 210/671 |

FOREIGN PATENT DOCUMENTS

| | | | |
|---|---|---|---|
| 2044473 | 12/1992 | Canada | E21B 43/24 |
| 0 130 632 A2 | 1/1985 | European Pat. Off. | C08F 2/32 |
| 2057914 C1 | 4/1996 | Russian Federation | E21B 43/22 |
| 1682539 A1 | 11/1989 | U.S.S.R. | E21B 43/22 |
| 1796013 A3 | 2/1993 | U.S.S.R. | E21B 43/40 |

OTHER PUBLICATIONS

Soo, H., Williams, M.C., and Radke, C.J. "A Filtration Model for the Flow of Dilute, Stable Emulsions in Porous Media–II. Parameter Evaluation and Estimation", *Chemical Engineering Science*, vol. 41, No. 2 (1986) pp. 273–281.

Menon, V.B. and Wasan, D.T. "Characterization of Oil–Water Interfaces Containing Finely Divided Solids with Applications to the Coalescence of Water–in–Oil Emulsions: A Review", *Colloids and Surfaces*, 29 (1988) pp. 7–27.

(List continued on next page.)

*Primary Examiner*—Philip Tucker
*Attorney, Agent, or Firm*—Kurt D. VanTassel; Keith A. Bell

[57] ABSTRACT

The disclosed invention is a solids-stabilized emulsion and method for making same for use in recovering hydrocarbons from a subterranean formation. More specifically, the emulsion comprises oil and water and is stabilized using undissolved solid particles, which are preferably at least partially oleophilic. Carbon dioxide or another gas is added to the emulsion to adjust the emulsion's viscosity to the desired level. The solids-stabilized emulsion may be used either as a drive fluid for displacing hydrocarbons from the formation or to produce a barrier for diverting flow of fluids in the formation. Such solid particles may be either formation solid particles (i.e., indigenous to the formation) or nonformation solid particles (i.e., obtained from outside the formation). Nonformation solid particles may either be naturally occurring or synthetic. Some preferred solids include clays, quartz, feldspar, gypsum, coal dust, asphaltenes, and polymers.

15 Claims, 9 Drawing Sheets

OTHER PUBLICATIONS

Sundstrom, Donald W. and Klei, Herbert E. "Wastewater Treatment", Department of Chemical Engineering, The University of Connecticut (1979) pp. 10–13.

Chung, Keng H. and Butler, Roger M. "In–situ Emulsification by the Condensation of Steam in Contact with Bitumen", 39th Annual Technical Meeting of the Petroleum Society of CIM (Jun. 12–16, 1988) Paper No. 88–39–18 pp. 18–1 to 18–17.

Rege, S.D. and Fogler, H.S. "A Network Model for Deep Bed Filtration of Solid Particles and Emulsion Drops", AIChE Journal, vol. 34, No. 11 (Nov. 1988) pp. 1761–1772.

Fiori, Marco and Farouq Ali, S.M. "Optimal Emulsion Design for the Recovery of a Saskatchewan Crude", 40th Annual Technical Meeting of the Petroleum Society of CIM (May 28–31, 1989) Paper No. 89–40–43, pp. 43–1 to 43–28.

Mikula, R.J., Munoz, V.A., and Lam, W.W. "Microscopic Characterization of Emulsion Interfaces", 1989 Eastern Oil Shale Symposium (Nov. 15–17, 1989) Institute for Mining and Minerals Research, University of Kentucky, pp. 287–292.

Levine, S. and Bowen, B.D. "Capillary interaction of spherical particles adsorbed on the surface of an oil/water droplet stabilized by the particles. Part I", *Colloids and Surfaces*, 59 (1991) pp. 377–386.

Levine, S. and Bowen, B.D. "Capillary interaction of spherical particles adsorbed on the surface of an oil/water droplet stabilized by the particles. Part II" *Colloids and Surfaces*, 65 (1992) pp. 273–286.

Mendoza, Humberto, Thomas, Sara, and Farouq Ali, S.M. "Effect of Injection Rate on Emulsion Flooding for a Canadian and a Venezuelan Crude Oil", CIM/AOSTRA 1991 Technical Conference (Apr. 21–24, 1991) Paper No. CIM/AOSTRA 91–26, pp. 26–1 to 26–6.

Friesen, W.I. and Levine, S. "Electrostatic Interaction between Two Water–in–Oil Emulsion Droplets in an Electric Field", *Journal of Colloid and Interface Science*, vol. 150 No. 2 (May 1992) pp. 517–527.

Chen, Techlen; Chakrabarty, Tapan; Cullen, Malcolm P.; Thomas, Ray R; and Sieben, Michelle C. "Laboratory and Field Evidence of Emulsion Flow in Porous Media", CIM/AOSTRA 1991 Technical Conference (Apr. 21–24, 1991) Paper No. CIM/AOSTRA 91–78, pp. 78–1 to 78–14.

Yuan, F. and Pal, R. "Composition Measurement of Emulsions and Emulsions with Added Solids Using a Microwave Techniqiue", Sixth Petroleum Conference of The Petroleum Society of CIM, (Oct. 16–18, 1995) Paper No. 95–148, pp. 1–15.

Broz, J.S., French, T.R., and Carroll, H.B. "Blocking of High Permeability Zones in Steamflooding by Emulsions", Third International Conference on Heavy Crude and Tar Sands, (Jul. 22–31, 1985) vol. 1, pp. 443–451.

Dieken, F.P, Skinner, F.W., Wharmby, A.W., and Wu, S. "Methods Manual for Chemical Analysis of Water and Wastes", Alberta Research Council (Updated 1996) pp. 1–4.

Tronov, V.P. and Shireyev, A.I. "Effect of Desalinization of Stratal Water on Rheological and Demulsification Properties of Forming Emulsions", Tatar Scientific Research and Planning Institute of the Petroleum Industry (1991).

SOLIDS-STABILIZED EMULSION

REFERENCE TO RELATED APPLICATIONS

This application is a division of U.S. patent application Ser. No. 09/062,167, filed Apr. 17, 1998, now allowed which is a continuation-in-part of U.S. patent application Ser. No. 08/885,507, filed Jun. 30, 1997, pending which claims the benefit of U.S. Provisional patent application Ser. No. 60/047,620, filed May 23, 1997.

FIELD OF THE INVENTION

The present invention relates to a solids-stabilized emulsion for use in recovering hydrocarbons from a subterranean formation. The emulsion may be used either to displace hydrocarbons from the formation or to produce a barrier for diverting flow of fluids in the formation. Carbon dioxide or another gas is added to the emulsion to adjust the emulsion's viscosity to the desired level.

BACKGROUND OF THE INVENTION

Oil recovery is usually inefficient in subterranean formations (hereafter simply referred to as formations) where the mobility of the in situ oil being recovered is significantly less than that of the drive fluid used to displace the oil. Mobility of a fluid phase in a formation is defined by the ratio of the fluid's relative permeability to its viscosity. For example, when waterflooding is applied to displace very viscous heavy oil from a formation, the process is very inefficient because the oil mobility is much less than the water mobility. The water quickly channels through the formation to the producing well, bypassing most of the oil and leaving it unrecovered. In Saskatchewan, Canada, primary production crude has been reported to be about 2 to 8% of the oil in place, with waterflooding yielding only another 2 to 5% of the oil in place. Consequently, there is a need to either make the water more viscous, or use another drive fluid that will not channel through the oil. Because of the large volumes of drive fluid needed, it must be inexpensive and stable under formation flow conditions. Oil displacement is most efficient when the mobility of the drive fluid is significantly less than the mobility of the oil, so the greatest need is for a method of generating a low-mobility drive fluid in a cost-effective manner.

Oil recovery can also be affected by extreme variations in rock permeability, such as when high-permeability "thief zones" between injectors and producers allow most of the injected drive fluid to channel quickly to producers, leaving oil in other zones relatively unrecovered. A need exists for a low-cost fluid that can be injected into such thief zones (from either injectors or producers) to reduce fluid mobility, thus diverting pressure energy into displacing oil from adjacent lower-permeability zones.

In certain formations, oil recovery can be reduced by coning of either gas downward or water upward to the interval where oil is being produced. Therefore, a need exists for a low-cost injectant that can be used to establish a horizontal "pad" of low mobility fluid to serve as a vertical barrier between the oil producing zone and the zone where coning is originating. Such low mobility fluid would retard vertical coning of gas or water, thereby improving oil production.

For modestly viscous oils—those having viscosities of approximately 20–100 centipoise (cp)—water-soluble polymers such as polyacrylamides or xanthan gum have been used to increase the viscosity of the water injected to displace oil from the formation. For example, polyacrylamide was added to water used to waterflood a 24 cp oil in the Sleepy Hollow Field, Nebr. Polyacrylamide was also used to viscosify water used to flood a 40 cp oil in the Chateaurenard Field, France. With this process, the polymer is dissolved in the water, increasing its viscosity.

While water-soluble polymers can be used to achieve a favorable mobility waterflood for low to modestly viscous oils, usually the process cannot economically be applied to achieving a favorable mobility displacement of more viscous oils—those having viscosities of from approximately 100 cp or higher. These oils are so viscous that the amount of polymer needed to achieve a favorable mobility ratio would usually be uneconomic. Further, as known to those skilled in the art, polymer dissolved in water often is desorbed from the drive water onto surfaces of the formation rock, entrapping it and rendering it ineffective for viscosifying the water. This leads to loss of mobility control, poor oil recovery, and high polymer costs. For these reasons, use of polymer floods to recover oils in excess of 100 cp is not usually technically or economically feasible. Also, performance of many polymers is adversely affected by levels of dissolved ions typically found in formations, placing limitations on their use and/or effectiveness.

Water-in-oil macroemulsions have been proposed as a method for producing viscous drive fluids that can maintain effective mobility control while displacing moderately viscous oils. For example, the use of water-in-oil and oil-in-water macroemulsions have been evaluated as drive fluids to improve oil recovery of viscous oils. Such emulsions have been created by addition of sodium hydroxide to acidic crude oils from Canada and Venezuela. In this study, the emulsions were stabilized by soap films created by saponification of acidic hydrocarbon components in the crude oil by sodium hydroxide. These soap films reduced the oil/water interfacial tension, acting as surfactants to stabilize the water-in-oil emulsion. It is well known, therefore, that the stability of such emulsions substantially depends on the use of sodium hydroxide (i.e., caustic) for producing a soap film to reduce the oil/water interfacial tension.

Various studies on the use of caustic for producing such emulsions have demonstrated technical feasibility. However, the practical application of this process for recovering oil has been limited by the high cost of the caustic, likely adsorption of the soap films onto the formation rock leading to gradual breakdown of the emulsion, and the sensitivity of the emulsion viscosity to minor changes in water salinity and water content. For example, because most formations contain water with many dissolved solids, emulsions requiring fresh or distilled water often fail to achieve design potential because such low-salinity conditions are difficult to achieve and maintain within the actual formation. Ionic species can be dissolved from the rock and the injected fresh water can mix with higher-salinity resident water, causing breakdown of the low-tension stabilized emulsion.

Various methods have been used to selectively reduce the permeability of high-permeability "thief" zones in a process generally referred to as "profile modification". Typical agents that have been injected into the reservoir to accomplish a reduction in permeability of contacted zones include polymer gels or cross-linked aldehydes. Polymer gels are formed by crosslinking polymers such as polyacrylamide, xanthan, vinyl polymers, or lignosulfonates. Such gels are injected into the formation where crosslinking reactions cause the gels to become relatively rigid, thus reducing permeability to flow through the treated zones.

In most applications of these processes, the region of the formation that is affected by the treatment is restricted to near the wellbore because of cost and the reaction time of the gelling agents. Once the treatments are in place, the gels are relatively immobile. This can be a disadvantage because the injected fluid (for instance, water in a waterflood) eventually finds a path around the immobile gel, reducing its effectiveness. Better performance should be expected if the profile modification agent could slowly move through the formation to plug off newly created thief zones, penetrating significant distances from injection or production wells.

McKay, in U.S. Pat. No. 5,350,014, discloses a method for producing heavy oil or bitumen from a formation undergoing thermal recovery. Production is achieved in the form of oil-in-water emulsions by carefully maintaining the temperature profile of the swept zone above a minimum temperature. Emulsions generated by such control of the temperature profile within the formation are taught to be useful for forming a barrier for plugging water-depleted thief zones in formations being produced by thermal methods, including control of vertical coning of water. However, this method requires careful control of temperature within the formation zone and, therefore, is useful only for thermal recovery projects. Consequently, the method disclosed by McKay could not be used for non-thermal (referred to as "cold flow") recovery of heavy oil.

Accordingly, there is a need for a method to produce an emulsion that can be made economically and is capable of performing under a wide range of formation conditions, including salinity, temperature, and permeability.

SUMMARY OF INVENTION

According to the invention, there is provided a method for producing a fluid having hydrocarbons from a subterranean formation having hydrocarbons and formation solids, comprising:

(a) making a solids-stabilized emulsion having water, oil, and undissolved solids, said solids comprising particles selected from the group consisting of formation solid particles, nonformation solid particles, and combinations thereof;

(b) contacting the formation with said emulsion; and (c) producing said fluid from the formation using said emulsion.

Preferably, such solids are comprised of particles having at least some oleophilic character for making an oil-external emulsion or some hydrophilic character for making a water-external emulsion. More preferably, such particles will have an average particle size measurement which is about 2 microns or less, such average particle size measurement being the largest of each of three measurements taken along the x, y, and z axis of each such particle and said average being determined using either a weight or number distribution of such particles in a representative sample of such solids. If desired, carbon dioxide or another gas can be added to the emulsion to decrease the emulsion's viscosity.

BRIEF DESCRIPTION OF THE DRAWINGS

The present invention and its advantages will be better understood by referring to the following detailed description and the attached drawings in which.

Figure 1:
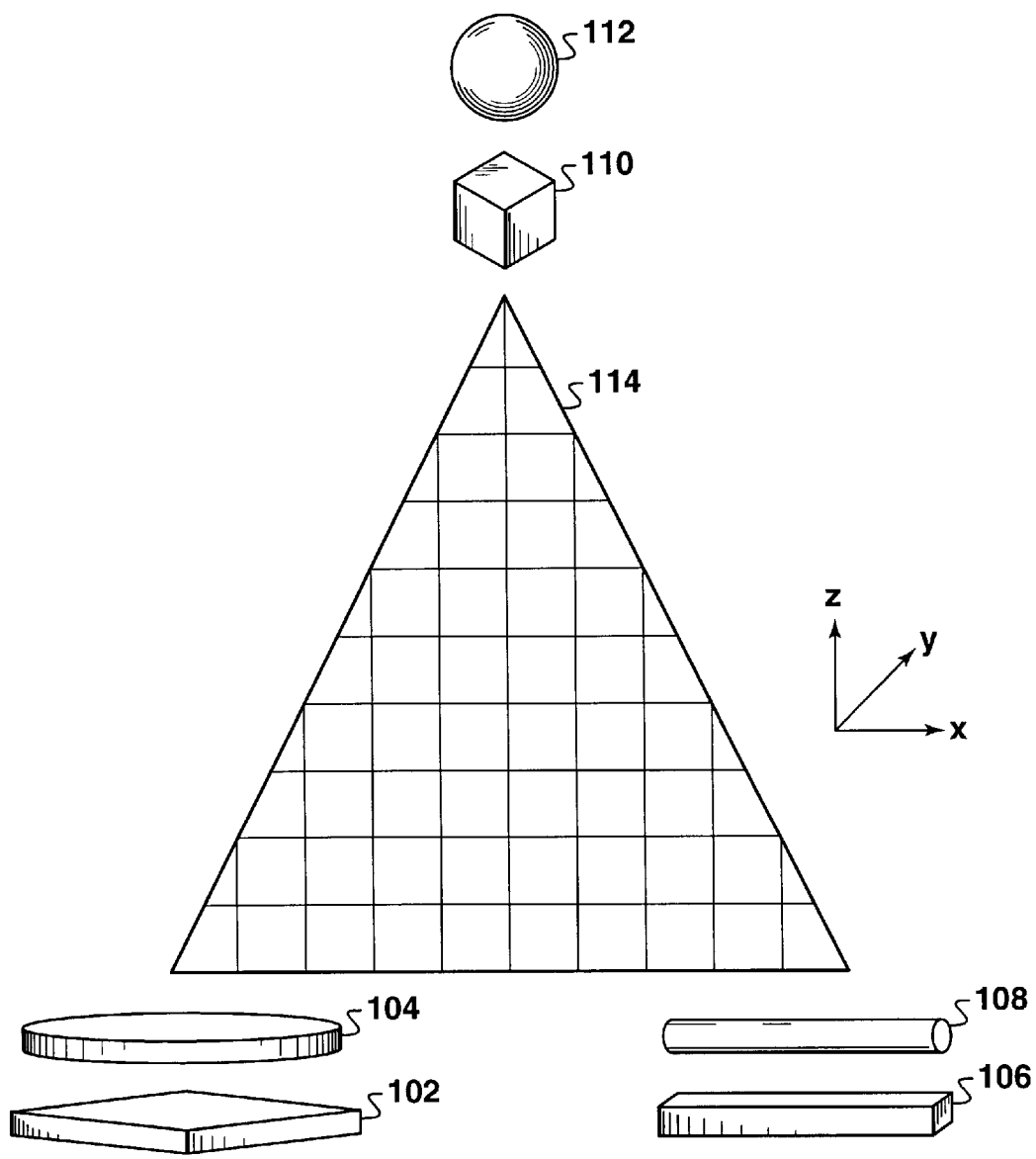
FIG. 1 is a ternary diagram that illustrates some, but not all, of the particle shapes that could be characteristic of the particles used to compose the solids used to make a solids-stabilized emulsion.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which are included within the spirit and scope of the invention, as defined by the appended claims.

DETAILED DESCRIPTION OF THE INVENTION

A "solids-stabilized" emulsion made with particles comprising fine, solid particles is essential to practicing the invention more fully described below. Solids-stabilized emulsion means that solid particles are the primary means, but not necessarily the only means, by which the films surrounding the internal phase droplets of an emulsion are maintained in a stable state under formation conditions for a sufficient time to use an emulsion as intended (e.g., enhance rate and/or amount of hydrocarbon production from a formation). Such solid particles are resistant to the chemical reactions that tend to deactivate surfactants, thereby causing de-stabilization or breaking of the emulsion. Consequently, solids-stabilized emulsions are stable over a wide range of formation water salinity.

Also, the term "solid", as used herein, means a substance in its most highly concentrated form, i.e., the atoms or molecules comprising the substance are more closely packed with one another relative to the liquid or gaseous states of the substance either under formation or nonformation conditions. Some substances that qualify as a solid under the preceding definition, such as polymers or certain ceramic materials including, without limitation, glass or porcelain, are often classified under a rigorous material science definition as highly viscous liquids because they are amorphous (i.e., lacking a crystalline structure). However, such substances are intended to fall within the meaning of the term "solid", as used herein, despite their more rigorous classification as "liquids".

Also, the source of the solids used for making a solids-stabilized emulsion may be indigenous to the formation where such emulsion is used, hereinafter known as formation solids, or may be obtained external to the formation, whether taken from another formation, mined, or synthesized, hereinafter known as nonformation solids. In certain instances, in fact, both formation and nonformation solids may be compositionally similar, but simply derived from different sources.

The particles composing the solids used for making the solids-stabilized emulsions disclosed herein can have a wide range of chemical compositions, shapes, and sizes. The solid particles, however, should have certain physical and chemical properties.

First, the solid particles should have at least some oleophilic character for making an oil-external emulsion or some hydrophilic character for making a water-external emulsion. Such character is important for ensuring that the particles can be properly wetted by the external continuous phase, whether oil, water or some other solvent, that holds the internal, discontinuous phase. The appropriate oleophilic or hydrophilic character may be an inherent characteristic of the solid particles or either enhanced or acquired by treatment of the particles. The solid particles can be comprised of substances including, without limitation, clays, quartz, feldspar, gypsum, metal sulfides, metal sulfates, metal oxides, coal dust, asphaltenes, or polymers. Preferably, however, the particles comprise at least about 5% by weight of an ionic and nonorganic substance, where an organic substance, as used herein, means a substance consisting of at least carbon and hydrogen atoms.

Second, the solid particles must remain undissolved in either the water or hydrocarbon phase under formation conditions, but have appropriate charge distribution for stabilizing an interfacial film between the internal droplet phase, preferably water but alternatively oil, and the external continuous phase, preferably oil but alternatively water, to make either a solids-stabilized oil-external emulsion or water-external emulsion, respectively.

Third, the actual individual particle size should be sufficiently small to provide adequate surface area coverage of the internal droplet phase. Particle size can be measured by a wide array of particle size analytical techniques, including laser light scattering, mesh screen classification, Coulter counting method, and settling velocity (which uses Stokes law to convert a solid sample's settling velocity in a fluid to an average particle size). However, each of these techniques produces an "effective" particle diameter, which is the result that would have been produced by a corresponding test sample comprised of particles with a spherical shape. Consequently, a particle's effective diameter becomes a less accurate approximation of its true size as the particle's shape deviates further from a spherical shape. In most instances, however, particles are often irregular and nonuniform in shape.

Without intending to limit the scope of the invention, FIG. 1 illustrates this point with a ternary diagram, 114, having three fundamental shape groups. The first group is a plate or pie shape, 102 and 104; the second is a bar or cylinder shape, 106 and 108, and the third is a cube or sphere shape, 110 and 112. Typically, particles composing the solids used for making a solids-stabilized emulsion disclosed herein will have some composite irregular shape that is somewhere between the two or three basic shape groups illustrated in ternary diagram, 114. Accordingly, the size of particles composing such solids are preferably determined using a scanning probe microscopy (SPM) technique. One example of such a technique is atomic force microscopy. Digital Instruments of Santa Barbara, Calif. manufactures an atomic force microscope (AFM) known as the Nanoscope Multimode™, which has been used to characterize the average size and shape of some of the solid particles used in the working examples disclosed below.

Using AFM or some other SPM technique the maximum dimensions of a particle along its x, y, and z axes can be determined. Therefore, unless reference to an alternative particle size analysis method is otherwise indicated, reference to a particle size will mean the largest of the three dimensions measured along a particle's x, y, and z axis, as measured by a SPM technique. In the case of a perfect sphere, 112, or cube, 110, each dimension is equal while in the case of a particle having the shape of a pie, 104, or plate, 102, the thickness of the particle, as measured along the z axis, is small relative to it length, x, and width y. The "average" particle size for a particular sample can be determined by obtaining a sufficient number of measurements, preferably 50 or more, of the largest dimension for the array of particles being analyzed. The average size can be calculated using both the weight average and number average methods. The number average method uses the number of particles among the total measured having a particular x, y, or z value, whichever value is largest. The weight average method uses the weight contribution of the respective particles having a particular x, y, or z value, whichever value is largest, among the total weight for all particles measured. The smallest of each of these two averages will be the relevant average used for practicing the invention disclosed herein.

The solids-stabilized emulsion disclosed herein can be applied in a variety of applications within a formation to improve oil recovery, including, without limitation using such emulsions:

(a) as drive fluids to displace oils too viscous to be recovered efficiently by waterflooding in non-thermal (or "cold flow") or thermal applications;

(b) to fill high permeability formation zones for "profile modification" applications to improve subsequent waterflood performance, particularly in formations containing lower viscosity oils (<100 cp); and (c) to form effective horizontal barriers to vertical flow of water or gas to reduce coning of the water or gas to the oil producing zone of a well.

Solids-stabilized emulsions used for practicing the invention are preferably generated above ground and injected as pre-mixed emulsion. Alternatively, a solids-stabilized emulsion can be generated "in situ" by injecting the requisite solid particles dispersed in water into a formation having hydrocarbons which can be used for making the emulsion in situ.

The oil used for making the solids-stabilized emulsion should contain a sufficient amount of asphaltenes, polar hydrocarbons, or polar resins to help stabilize the solid particle-oil interaction. Preferably the emulsion's oil is comprised of oil previously produced from the formation where the emulsion is to be used, or, if the emulsion is made in-situ, the emulsion oil will be oil within the region of the formation where the emulsion is made. For example, the solids-stabilized emulsions disclosed herein are preferably used to recover moderately viscous or heavy oils (i.e., about 20 centipose to about 3,000 centipose). Such oils, by nature of their composition, usually contain sufficient asphaltenes and polar hydrocarbons, which will help stabilize the solids-stabilized emulsion. However, where the emulsion oil does not contain a sufficient amount of asphaltenes or polar hydrocarbons, these substances can be added with the solids to a concentration required for stabilizing the emulsion. The emulsification tests, described in detail below, can be used to determine whether any adjustment in the asphaltene or polar hydrocarbon concentration is required.

The water used for making the solids-stabilized emulsion should have sufficient ion concentration to keep the emulsion stable under formation conditions. Preferably, formation water is used to make the emulsion. However, fresh water could be used and the ion concentration adjusted as needed for stabilizing the emulsion under formation conditions.

Also, as mentioned above, particle size is critical to making a solids-stabilized emulsion under formation conditions. The average solid particle size, as defined above, should be about ten microns or less, but preferably about two microns or less, more preferably about one micron or less and most preferably, 100 nanometers or less. Particle shape may also contribute to the emulsion's stability under formation conditions.

Other factors to consider in designing a solids-stabilized emulsion include, without limitation, the order in which the fluids are combined and mixed to form the desired external and internal phases, the amount of mixing energy used to disperse droplets of the internal phase into the external phase, and wetting properties of the solids, which affects the type of emulsion formed on mixing with the oil and water. For example, solids that are wetted by oil (i.e., oleophilic solids) will tend to form an oil-external emulsion, and solids that are wetted by water (i.e., hydrophilic solids) will tend to form a water-external emulsion. Because mixing procedures play a significant role in making effective solids-stabilized emulsions, some general principles related to making solids-stabilized emulsions, oil-external, water-external, and an emulsion containing gas, are provided below.

Making Oil-External Solids-Stabilized Emulsions

Solids used to form water-in-oil (i.e., oil-external) emulsions should preferably have oleophilic or mixed-wettability wetting behavior. Such solids, if not naturally oil wetting or of mixed wettability, may be pre-contacted with the oil, or preconditioned, for a time period sufficient to allow adsorption of polar hydrocarbons or asphaltenes onto their surfaces to render them partially or totally oleophilic prior to their being mixed with final concentrations of oil and water. Other treatments, such as reacting silanol groups on the surfaces of mineral solids with chemicals such as organosilanes, or adsorption of surfactants on the solid surfaces, may be used to make the surfaces oleophilic before they are added to the oil and water.

A preferred method for generating such solids-stabilized water-in-oil emulsions is to first disperse the solids (preconditioned if necessary) in the oil phase, and then blend the said oil-solids mixture with water and subject the blend to sufficient shearing/mixing energy to produce water droplets sufficiently small to remain dispersed and stabilized in the oil.

The order and manner of mixing can have great effect on the properties of the resulting emulsion. For example, high-water-content oil-external emulsions are best produced by adding the water to the oil rather than adding oil to water. Water can be added to the oil to increase its concentration in small increments, with continuous shearing, until the total desired water content is reached. Such processing can produce water droplets having average diameters ranging from sub-micron to approximately 30 microns, depending on the type and amount of shearing energy input, the sizes and concentration of solid particles employed, the viscosity of the oil, the composition of polar and asphaltene hydrocarbons, and, to a lesser extent, the ionic composition of the water employed. Other methods of mixing emulsions known to those skilled in the art may be employed so long as the resulting emulsion is oil-external, is stable under formation conditions, and has the appropriate viscosity.

Making Water-External Solids-Stabilized Emulsions

Solids used to form oil-in-water (i.e., water-external) emulsions should preferably have hydrophilic wetting behavior, and preferably such solids should not have been exposed to hydrocarbons prior to use in stabilizing the emulsion. A preferred method for generating such oil-in-water emulsions is to first disperse the solids in the water, then add oil to the mixture with sufficient continuous shearing/mixing energy to produce oil droplets dispersed and stabilized in the water phase. If necessary to prevent forming oil-external emulsions, oil can be added to the water in small portions, with continuous shearing, until the total desired oil content is reached. Such processing can produce oil droplets having average diameters ranging from sub-micron to approximately 30 microns, depending on the type and amount of shearing energy input, the sizes and concentration of solid particles employed, the viscosity of the oil, the composition of polar and asphaltene hydrocarbons, and, to a lesser extent, the ionic composition of the water employed. Other methods of mixing emulsions known to those skilled in the art may be employed so long as the resulting emulsion is water-external, is stable under formation conditions, and has the desired viscosity.

General Principles Applicable to Both Oil-External and Water-External Emulsions

Once the droplets are sheared to produce the desired size, the solid particles arrange themselves at positions on the oil/water interface in a manner to prevent droplet coalescence, thus forming a stable emulsion. Emulsions generated in this manner are likely not thermodynamically stable as would be true microemulsions, but they can remain stable for months or years in a metastable state, and are sufficiently stable for practical applications in recovering oil from formations.

Generating the emulsions above ground and then injecting them as either drive fluids or as viscous banks to serve as flow barriers provides the best method of controlling the ratio of oil, water, and solids in the emulsion and of insuring quality control on the achieved viscosity, droplet size distribution, etc. However, when mixing above ground is not practical, water containing the dispersed solids can be injected into the formation so that blending occurs in situ with formation oil. In situ, shearing is naturally accomplished by flow of the fluids through the porous rocks.

Using Solids-Stabilized Oil-External and Water-External Emulsions in a Formation While solids-stabilized emulsions can be used in a wide range of applications, one typical application is using such emulsions for displacing heavy oil (e.g., 325 cp) from a formation under ambient formation temperature (e.g., 140° F.). A solids-stabilized oil-external emulsion applied in such a situation can yield an emulsion with a mobility which is lower than that of the crude oil being displaced. To minimize process cost, oil produced from the formation and water from a local source (from underground or other source) and solids comprised of clay particles having an average particle size less than 2 microns are preferably used.

This invention is best practiced in formations with rock having an absolute permeability that is sufficiently high so that the pore throats are large enough to allow individual emulsion droplets to pass through the pores unimpeded. The lower limit on permeability is thus dependent not only on the rock pore structure, but also on the droplet size distribution in the emulsion. For most applications, rock permeability is not expected to be a limiting factor. For example, many formation rocks containing heavy oil deposits have an absolute permeability of from 2,000–15,000 millidarcies (md). Such rocks have pore throats with average diameters of from approximately 20–200 microns. Droplets sizes in emulsions injected into these rocks are likely to range in diameter from less than 1.0 microns to 15 microns, thus the droplets should not be impeded in flow through such rocks. However, small droplet diameters are preferred to reduce possibility of trapping of the internal phase.

The lower limit of rock permeability to allow flow of a specific emulsion can be determined in laboratory tests by flowing said emulsion through a series of rocks of decreasing, but known, absolute permeability. Procedures for conducting such core flow tests are easily known to those skilled in the art, but involve measuring pressure drops across the core at measured flow rates and determining whether the emulsion is trapped within the rock pores or passes unimpeded through the rock. An exact lower limit for application of such solids-stabilized emulsions has not yet been established, but is believed to be below 1000 md for emulsions having average droplet diameters of less than approximately 5 microns. Such core flood tests conducted in rock representative of the target formation application are currently the best method for determining whether the droplet size distribution of the emulsion is sufficiently small to allow emulsion flow without trapping of droplets at pore throats. If such core flood tests suggest that trapping is occurring, applying additional shearing energy to further reduce average droplet size when formulating the emulsion may mitigate or avoid the problem. Additionally, a comparative core flood test using an alternative solids type having a wettability that is more or less oleophilic than the original solids type tested may be used to determine if increased stability during flow can be achieved. Accordingly, such comparative coreflood testing can be used to find the optimal solids type, wettability and concentration.

Making and Using Solids-Stabilized Emulsions Containing Gas

Although the above disclosure describes how water, oil, and fine solid particles can be used to make an emulsion useful for various applications within the formation for improving the recovery of oil, the use of such fine solids to stabilize emulsions also extends to emulsions containing gas. For example, a gas consisting of either natural gas, carbon dioxide, nitrogen, flue gas, air, or other gas can be incorporated into such emulsions as described above in order to modify the density of the emulsion, modify its viscosity, or to impart other properties beneficial for oil recovery.

Foams are special cases of emulsions containing very high gas contents, with internal gas bubbles stabilized by interfacial films containing water, hydrocarbons, or other liquids, and stabilized by surfactants or other emulsifying agents. Often surfactants are used to create stable films for creating foams. In the current method, the stable films are to be created by mixtures of oil, water, and fine solid particles, where the solid particles interacting with the oil and water stabilize the foam film.

Additions of gas to the emulsion mixture at the time that the oil, water, and solids are blended, mixed, and sheared will permit generation of either an emulsion comprising primarily liquids with a lesser fraction of gas, or a foam comprising primarily gas, with only sufficient liquids to form a stable foam, depending on the desired properties of the final mixture. An example use of this invention is when the density of a water-in-oil emulsion without included gas might be significantly greater than the density of oil to be displaced within the formation. If said emulsion without gas is injected to displace oil, gravity underride of the oil may occur because the emulsion would tend to sink below the oil to lower portions of the formation. However, sufficient gas can be included in the emulsion to cause the emulsion density under formation conditions to equal the density of the oil being displaced, thus avoiding gravity underride.

There are other applications of such gas-containing emulsions or foams stabilized by fine solids that will be apparent to those skilled in the art in view of the foregoing disclosure. Some examples are inclusion of gas to reduce the viscosity of the injected emulsion, or inclusion of compressible gas to store energy for release as the emulsion encounters lower-pressure zones within the formation.

Adjusting the Emulsion Viscosity by Adding Gas

Figure 2:
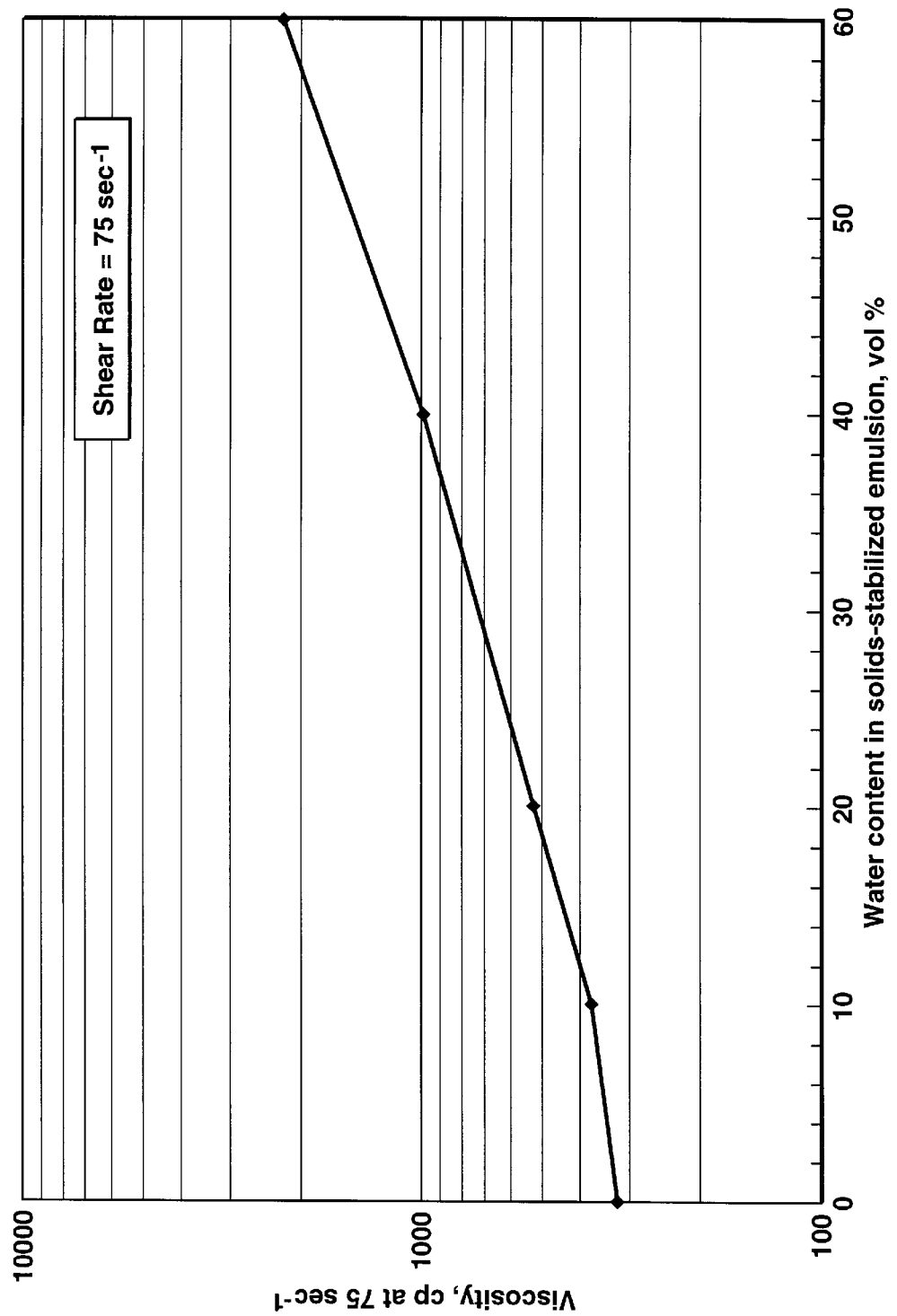
FIG. 2 illustrates a plot of the viscosity of a solids-stabilized emulsion, under a shear rate of 75 $sec^{-1}$ versus the emulsion's percentage water content by volume.

As noted above, gas may be added to an emulsion to adjust the emulsion's viscosity. As illustrated in FIG. 2, an important property of oil-external (i.e., water-in-oil) emulsions stabilized by solids is that the viscosity of the emulsion is always higher that the viscosity of the base oil used to form the external phase. While FIG. 2 shows the viscosity of one oil-external emulsion measured at a shear rate of 75 $\sec^{-1}$ as a function of water content, the increase in viscosity as a function of water content will be similar for other oil-external emulsions. When the emulsion is used as a drive fluid to displace oil from a reservoir, the most efficient oil recovery is obtained when the water content of the emulsion is high, for example 60 to 70 volume percent water or higher. At such water contents, the viscosity of the emulsion may be approximately 10-fold to 20-fold higher than the viscosity of the oil used to form the emulsion. If the oil used to form the emulsion has the same viscosity as the oil in the reservoir being displaced by the emulsion flood, the emulsion viscosity will be higher than needed for efficient flood performance.

To achieve efficient oil displacement in a reservoir flood, the mobility of the emulsion drive fluid preferably should be equal to or less than the mobility of the oil being displaced. As noted above, mobility of the fluid may be defined as the ratio of fluid relative permeability to fluid viscosity. The relative permeability of the oil being displaced or of the emulsion containing a fixed water content will depend on the rock properties such as lithology, pore size distribution, and wettability. These parameters are naturally governed by the fluid-rock system, and cannot normally be adjusted. However, the viscosity of an emulsion can be adjusted to control its mobility. For normal ranges of oil relative permeability and emulsion relative permeability, an emulsion viscosity of approximately two-fold to six-fold greater than the oil viscosity will produce a ratio of emulsion mobility/oil mobility of approximately 1.0 or less. This will produce efficient oil displacement while permitting acceptable emulsion injectivity and flood life. An emulsion viscosity that is higher than needed to achieve this mobility ratio will still provide very efficient oil displacement, but will also lead to higher pumping costs and a longer flood life, both of which reduce the economic profitability of the process.

An efficient method for adjusting the viscosity of an oil-external emulsion is to add a gas that is soluble in the oil phase (the continuous or external phase) of the emulsion and reduces its viscosity. Adding hydrocarbon gases such as methane, ethane, propane, butane, or natural gas mixtures can produce reductions in oil viscosity. However, other gases such as carbon dioxide and sulfur dioxide can be especially efficient in reducing oil viscosity at only modest concentrations. The emulsion viscosity therefore can be reduced by incorporating a gas into the emulsion. Generally, a sufficient amount of gas should be added to reduce the emulsion's viscosity to less than about ten times (more preferably, less than about six times) the viscosity of the oil being recovered. This can be achieved by saturating the emulsion with gas at a pressure necessary to achieve the desired equilibrium concentrations in both the oil and water phases of the emulsion.

Figure 9:
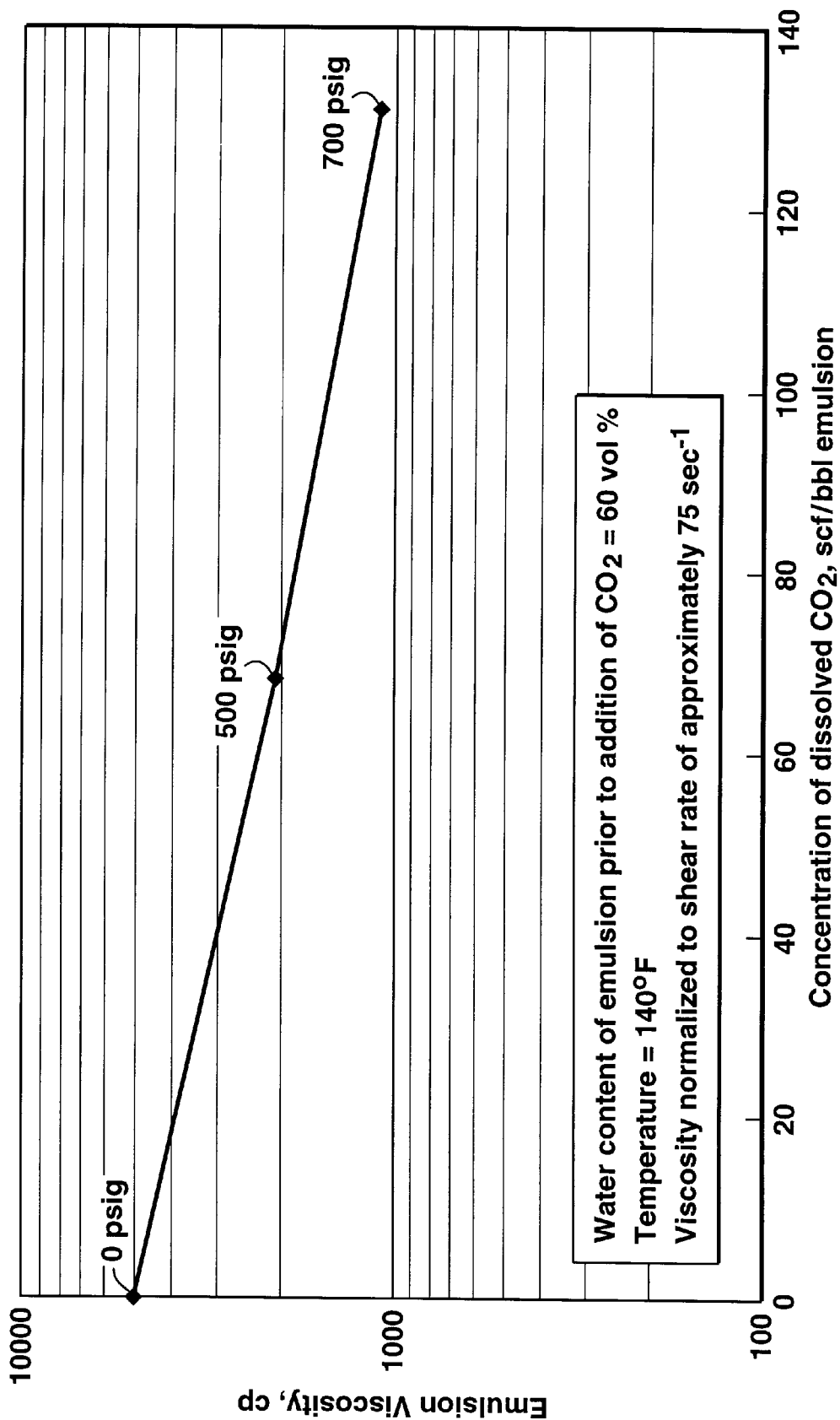
FIG. 9 illustrates a plot of the viscosity of a solids-stabilized emulsion containing 60 volume percent water as a function of the concentration of carbon dioxide dissolved in the emulsion.

FIG. 9 shows the viscosity of an emulsion initially containing 60 volume percent water in oil as a function of dissolved carbon dioxide concentration measured at 140° F. The emulsion was first prepared by blending water with a crude oil of 325 cp viscosity. Oleophilic fumed silica (Aerosil® R972) was incorporated as the stabilizer at a concentration of 0.5 g/L of emulsion. To generate the data plotted in FIG. 9, carbon dioxide gas was then added to the emulsion at a fixed pressure, as indicated, and the emulsion was mixed until the emulsion was saturated with carbon dioxide at a temperature of 140° F. The viscosity of the emulsion and the carbon dioxide concentration were then measured. FIG. 9 shows that at a pressure of 700 psig the emulsion contained 123 scf of carbon dioxide, and the emulsion viscosity was reduced to 1100 cp from the initial viscosity of 5000 cp with no dissolved carbon dioxide. The ratio of emulsion viscosity/base oil viscosity was thus reduced from 15.4 to 3.4.

In the field, the carbon dioxide can be added to the oil and water prior to blending of the emulsion, or alternately the emulsion can be blended prior to adding the carbon dioxide. Addition of carbon dioxide to the oil and water prior to blending the emulsion has the added benefit of reducing the viscosity of fluids during blending, thus reducing needed mixing energy. Carbon dioxide can be added to the fluids using any of a number of mechanical mixing methods known to those skilled in the art. For example, the carbon dioxide gas can be injected into the fluid upstream of a high-shear mixing device maintained at a pressure equal to or greater than the gas saturation pressure, or the carbon dioxide can be mixed into the fluid in a counter-current absorption tower operated at the desired pressure. Regardless of means used for mixing, the pressure within surface facilities needed to incorporate the desired amount of carbon dioxide (e.g. approximately 400 psi to 1000 psi) will generally be much less than pressures the emulsion will subsequently encounter within injection lines, injection wells, or the oil reservoir. Therefore, the carbon dioxide will remain dissolved in the emulsion over most or all of its useful lifetime, providing stable viscosity adjustment of the process.

While the above example illustrates the addition of carbon dioxide gas to the emulsion to reduce viscosity, it is understood that other gases may be used to adjust viscosity without departing from the true scope of the present invention. Also, while the viscosity reduction resulting from addition of a gas will likely be greatest where the emulsion is an oil-external emulsion, addition of a gas may also be beneficial in reducing the viscosity of a water-external emulsion. Accordingly, the present invention includes the addition of carbon dioxide or another gas to both oil-external and water-external emulsions to reduce the viscosity thereof.

Selection and Treatment of Candidate Solids

Enhanced emulsion stability will be achieved using solids that have: a high surface area/volume ratio, small mass and an average particle size of two microns or less, are attracted to polar or asphaltene hydrocarbons in the oil phase, and have surfaces that are either partially or substantially oleophilic (for forming oil-external emulsions) or hydrophilic (for forming water-external emulsions). To form an oil-external emulsion, solids capable of meeting these requirements include, without limitation, clays such as kaolinite or bentonites, or fumed silica treated to make the surfaces partially or substantially oleophilic.

Oleophilic fumed silicas, such as Aerosil® R972 or Aerosil® R974, manufactured by Degussa AG, CAB-O-SIL® TS-530 or CAB-O-SIL® TS-610 manufactured by Cabot Corporation, consist of small spheres of fumed silica that have been treated with organosilanes or organosilazanes to make the surfaces oleophilic. These are effective solids for stabilizing many crude oil emulsions. Such particles are extremely small, having primary particles consisting of spheres with diameters as small as about 10–20 nm, although the primary particles interact to form larger aggregates. Concentrations of these silicas have been found to be effective at concentrations of from approximately $\geqq 0.5$ g/L emulsion to $\leqq 20$ g/L emulsion.

Natural clays can be mined and processed to make inexpensive solids having large ratios of surface area to mass. For example, particles of kaolinite of approximately 1.0 micron or less in effective diameter, as measured by a laser light scattering technique, provide high surface area (approximately 10–20 $m^2/g$). These clays normally have hydrophilic surfaces. However, they can be mixed with crude oil at formation temperature in a suitable vessel and maintained sufficiently long to allow high molecular weight polar hydrocarbons and asphaltenes to adsorb onto the clay surfaces and render them partially or substantially oleophilic. The mixture should be gently stirred or mixed to maintain the particles in suspension and ensure good contact with the crude oil. A contact time of 24–72 hours or longer is usually sufficient to obtain oleophilic surfaces.

Bentonite clays, such as those mined in Wyoming, Ga., or other numerous locations around the world, are particularly suited as stabilizers for crude oil emulsions. As mined, these clays naturally consist of aggregates of particles that can be dispersed in water and broken up by shearing into units having average particle sizes of 2 microns or less, as measured by a laser light scattering technique. However, each of these particles is a laminated unit containing approximately 100 layers of fundamental silicate layers of 1 nm thickness bonded together by inclusions of atoms such as calcium in the layers. By exchanging the atoms such as calcium by sodium or lithium (which are larger and have strong attractions for water molecules in fresh water), and then exposing the bentonite to fresh water, the bentonite can be broken into individual 1 nm-thick layers, called fundamental particles. The chemistry of this delamination process is well known to those skilled in the art of clay chemistry. Delamination occurs because the sodium or lithium ions, in fresh water, attract sufficient water molecules between the layers (in a hydration process) that the layers are split apart into fundamental particles. This process can therefore be used to increase the surface area per unit mass of bentonite by approximately 100 fold, providing extremely small (1 mn thick by 1 micron or less in width) and active particles at low cost.

Also, solid particles used to make an emulsion can be treated to either develop or enhance their oleophilic or hydrophilic character. For example, delaminated bentonite particles can be precontacted with crude oil at formation temperature to allow adsorption of polar hydrocarbons and asphaltenes to render them partially or substantially oleophilic. It should be recognized that this is an example of one of many ways of enhancing the adsorption of polar hydrocarbons onto the solids to render them oleophilic; other methods can be used without diverting from the true scope of the invention.

Testing Procedures

Phase Behavior Screening Tests

Oil produced from the target formation and source water (or synthetic water prepared to duplicate the source water composition) are first tested for emulsification effectiveness with various candidate solids. In this example screening test, 40 ml of crude oil preheated to formation temperature is first added to a 250 ml centrifuge tube. Then a weighed mass of clay particles (e.g. a clay such as bentonite, kaolinite, illite, or other clay having particle sizes ranging from less than 1 micron to 2 microns diameter), or alternatively, another type of sub-micron-size solid such as fumed silica or coal dust, is added to the oil. The solids are then dispersed in the oil by inserting into the oil phase a laboratory blender capable of high shear (e.g. a Silverson Model L4RT operated at full speed, or approximately 6000 rpm) and shearing the oil/solids mix for 2 minutes. The desired amount of water (preheated to formation temperature) is then added in increments with continuous shearing (for example, 60 ml of water can be added in three 20 ml portions over a 6 minute period to provide a total of 100 ml of test mixture). Then the mixture is sheared for 10 minutes, the tube is capped, and the tube is placed in an oven whose temperature is maintained at formation temperature.

The tube is maintained quiescent for 24 hours, and then the volume of free water separated is visually observed. The sample is then centrifuged at 1000 rpm for 20 minutes (or at another speed and time judged appropriate as a measure of emulsion stability), and the volume of free excluded water is again measured. If no free water is observed, the sample is then centrifuged at 2000 rpm for an additional 10 minutes. Emulsions that do not break out free water under these test conditions may be judged good candidates for further testing in core floods. Samples showing superior stability can also be returned to the oven where their stability in quiescent state can be observed as long as desired (for example, over months).

For each candidate solid, a series of test emulsions should be generated that contain various ratios of water, oil, and solids concentrations to determine the optimal concentrations of each. A typical concentration of particles needed to stabilize such emulsion might range from less than 0.1 g/l emulsion to 20 g/l emulsion. The preferred water concentration in the emulsion might range from 50%–90%, depending on the desired emulsion viscosity and other considerations dictated by the formation application. Therefore, further screening tests may involve measurement of the emulsion viscosity. Additional tests may include measurement of droplet size distribution and average droplet size using microscopy or NMR methods. Preferred average droplet sizes will range from less than 1.0 micron to 10 microns. If the solids originally added to the oil do not produce the desired droplet size, additional solids having a different size distribution and/or composition may be added to the oil to achieve the desired droplet size distribution. Adjusting the size distribution of solids utilized is but one of several parameters that may be adjusted to achieve the desired size distribution of droplets and water content in the emulsion. The size ratio of average particle size/average droplet diameter may range from about 0.001 to about 1, with the preferred ratio being less than about 0.5. The exact ratio will depend on the size distribution of particles employed, the composition of the solid particles employed, the level of shearing energy input, etc. A mixture of solids having differing compositions and/or wettabilities may also be employed. However, final choice of solids concentration, water content in the emulsion, emulsion phase state, and droplet size should be based on tests conducted in core floods under formation conditions where the emulsion must remain stable while flowing through rock pores.

Core Flood Tests

Final selection of emulsion composition should be determined by tests in which candidate emulsions are injected into a core representative of formation rock and containing formation crude oil and brine (or synthetic brine of composition equivalent to formation brine), all maintained at formation temperatures. This is important because static or centrifuge phase behavior tests do not subject the emulsions to the constant low-level shear always present during flow through porous media, and centrifuge tests subject droplets to higher gravitational forces than in porous media. Therefore, the core flood should preferably be conducted at interstitial flow velocities representative of those anticipated in field applications (e.g. 1–3 ft/d) to test for phase stability of the emulsion and its ability to efficiently displace and recover oil.

Core flood test procedures are well known to those skilled in the art, but the following summarizes tests used to evaluate oil displacement efficiency by emulsion flood. Irreducible (or connate) water saturation is first established by injecting crude oil into a core filled with formation brine. The core should be either actual preserved core from the formation or sand/rock thought to be representative of the formation. The core should then be allowed to equilibrate with the crude oil to achieve correct rock wettability before the flood is initiated. The emulsion is then injected into the core at constant rate, and pressure gradients from the inlet to the outlet of the core, and optionally over measured axial distances within the core, are measured versus volume of emulsion injected. Volumes of water and oil produced are measured, and water and oil saturations within the core are computed as a function of the volume of emulsion injected.

Water-phase and oil-phase tracers may also be employed in various fluids to assist in determining stability of the emulsion during flow. Primary measures of emulsion suitability are: oil recovery efficiency, amount of separation of water from the emulsion, and stable pressure gradients within the emulsion bank versus time and distance along the core. Optimization of the emulsion formulation can be achieved by comparing results of core floods as a function of emulsion composition and method of emulsion preparation. As known to those skilled in the art of enhanced oil recovery, the optimal emulsion may be one judged to satisfy one or more subjective criteria such as maximizing oil recovery or minimizing drive bank mobility.

Making and Using an Oil-External Emulsion in the Field

The following description, disclosed without limitation and for illustrative purposes, is only one example of how the invention could be deployed in the field. Other methods of making and using solids-stabilized emulsions in the field will become apparent to those skilled in the art in view of the following field application description. The desired concentration and type of oleophilic solids, determined from the laboratory screening tests, are added to a tank of crude oil produced preferably from the same formation. The tank and piping are insulated to maintain the oil at or near the formation temperature, and the solids are dispersed by continuously pumping oil through the tank to keep it stirred as solids are added. Other mixing arrangements can be used, as is readily apparent to those skilled in the art. This tank provides a concentrated dispersion of solids in crude oil.

The emulsion can be made by blending the required volume ratio of crude oil/solids concentrate with crude oil and water in either a continuous flow process through a series of one or more colloid mills (or through other shearing devices readily known to those skilled in the art), or fluids can be recycled through a single shearing device from one storage tank to another in a batch mode. For example, if colloid mills are used in a continuous (once-through) mode, the number of mills and their rotation speed and gap setting can be adjusted to assist in producing water droplets of the desired average diameter (preferably of about 5 microns or less). Water can be added incrementally between each colloid mill to achieve the final target value without adverse phase inversion. The emulsion is then ready to be injected into the formation to displace oil.

For such example application, if the oil viscosity is 325 cp, and the water content of the emulsion is 80%, emulsion viscosity might be approximately 3000 cp at 10 sec$^{-1}$. In certain instances, however, injectivity of such viscous emulsions may be lower than desired for an economic flood life. One method for increasing the injectivity of such emulsions would be to heat the emulsion before injection so that the emulsion's viscosity is decreased in the near wellbore region. Away from the near wellbore region, the heated emulsion will cool to formation temperature and the target viscosity will be achieved. Therefore, an efficient displacement of the heavy oil can be achieved, either with or without heating the emulsion, as appropriate. The final water saturation in well-swept zones of the formation might be about 80%, or the same as the concentration of water in the injected emulsion. Therefore, under the best mode of operation the injected emulsion should achieve an almost piston-like displacement of oil ahead of the emulsion because of its significantly lower mobility compared to the oil. Under these conditions, the emulsion, being very viscous and oil-external and therefore more similar in relative permeability behavior to oil than to water, achieves a final oil saturation that is less than would ultimately be realized in a waterflood, but at significantly less volume injected. For these formation conditions, a pattern waterflood might be expected to recover 20% or less of the oil in place after 1.0 pore volume injection, while the net recovery of oil by the emulsion flood could exceed 50% of original oil in place, or almost triple the waterflood recovery.

Evaluation of Solids-Stabilized Emulsions—Lab Examples

The following laboratory test was conducted to demonstrate the effectiveness of a solids-stabilized emulsion as a drive fluid for displacing and recovering heavy oil from a formation. In this test, an oil-external emulsion stabilized by kaolinite clay particles having a median particle size of about 2.2 microns as measured by a laser light scattering technique, was prepared and injected into a core of formation sand containing a heavy oil of 325 cp viscosity at the formation test temperature of 140° F.

Chemical tracers were added to the oil and water contained within the emulsion to allow identification of those components in the fluids produced from the core and their differentiation from resident oil and brine in the core at the start of the test. Data also were collected to measure overall pressure drop, oil recovery, water cut in the produced fluid, and average fluid saturations within the core, all as functions of the volume of emulsion injected.

Unconsolidated sand obtained from extracted cores taken from a heavy oil formation was used to prepare a core test specimen. The core was prepared by first filling a lead-sleeved core holder with the sand. Wire screens were placed at the inlet and outlet of the core to retain the sand, and the outer length of the assembly was then wrapped with plastic film and aluminum foil, and then placed within a rubber sleeve in the same manner as is commonly used to prepare unconsolidated sand cores for flooding. This core assembly was then placed in a triaxial core holder, and an overburden stress of 1800 psi was placed on the core to simulate typical formation overburden conditions. Pressure transducers were used to measure the overall pressure drop across the core. The core holder was then placed inside an oven maintained at a constant formation temperature of 140° F. All subsequent flooding operations were then conducted at this temperature, including preparation and storing of the emulsion. Table 1 summarizes pertinent properties measured for the core.

TABLB 1

| Core Property | Measured Value |
| --- | --- |
| Permeability to oil at $S_{wi}$ | 3,440 md |
| Porosity | 27.9% |
| $S_{wi}$ (irreducible water saturation) | 20.1% pv |
| Core length | 16.1 cm |
| Core cross-sectional area | 11.4 cm$^2$ |
| core pore volume (pv) | 51.2 cc |
| Net overburden stress | 1,800 psi |

A brine was prepared by adding sodium chloride and potassium chloride to distilled water to provide the concentrations shown in Table 2. This brine was used to saturate the core and to formulate the emulsion to be injected.

TABLE 2

| Component | Concentration (mg/kg of brine) |
| --- | --- |
| K$^+$ ion | 5,244 |
| Na$^+$ ion | 7,867 |
| Cl$^-$ | 16,888 |
| total dissolved solids | 30,000 |

To prepare the core for the test flood, a vacuum was pulled on the core, and then brine was flowed into the core to achieve 100% water saturation. A heavy oil of 325 cp viscosity was then injected into the core at a rate 2 cc/min. to establish an irreducible (connate) water saturation ($S_{wi}$) of 20.1% pv (pore volume). This established conditions representative of the initial conditions in the formation prior to injection of any fluid.

Fine mineral particles were added to oil to be emulsified to allow the solid particles to become oil wet prior to being blended with water. Addition of solids to the oil before adding water is preferable if a water-in-oil emulsion is desired. First, fine mineral particles identified here as "field mix" and consisting primarily of kaolinite clay (>90%), with minor portions of chlorite, sylvite, and quartz were added to a heavy crude oil of 325 cp viscosity. A laser particle size instrument was used to analyze the particle size distribution of the solids added to the oil. Results showed that the mean particle size was about 3.2 microns, the median size was about 2.2 microns, with at least 40% of the particles having an effective diameter of 2 microns or less. However, this instrument could not measure particles below about 0.8 microns in effective particle diameter, and thus likely underestimates the number of particles having sizes less than 1 micron.

The total amount of "field mix" mineral solids added to the oil was approximately 10 g/liter oil; however, this was considerably in excess of the amount required for efficient emulsification, and the oil was centrifuged at 3000 rpm at 140° F. for approximately 18 hours to remove the excess. Approximately 90% of the solids were removed by centrifugation. Tests showed that this centrifuged oil readily emulsified with water, and still contained sufficient mineral fines for efficient emulsification. To prove that the mineral fines were indeed the emulsifying agent, a sample of the centrifuged oil was then filtered in an in-line filter having a nominal pore size rating of 0.4 microns. However, this filter likely removed particles of sizes smaller than about 0.4 microns that became trapped by the filter cake. An analysis of the filtered material by scanning electron microscope showed that it consisted almost entirely of mineral fines, so no significant amount of any hydrocarbon component was removed. The filtered oil would not emulsify with water. However, re-adding mineral fines to the filtered oil restored its ability to readily emulsify.

Further tests showed that other minerals having an average particle size of about 2 microns or less (and preferably 1 micron or less), would readily emulsify the filtered oil if the solids were preconditioned in crude oil for >24 hours to make them oleophilic. For example, a totally different sample of purified kaolinite clay, identified as KGa-1, obtained from the Source Clay Repository of the Clay Mineral Society, with a mean particle size of about 1.6 microns, a median size of about 1.6 microns, and with at least 80% of the particles having a size of 2 microns of less (as measured by laser particle size analysis), was found to readily cause the filtered oil to incorporate 60% water in an oil-external emulsion at a concentration of 0.5 g/L oil. Oleophilic fumed silica (Cabot CAB-O-SIL TS-530) added to the filtered oil at a concentration of 50 g/L of oil formed oil-external emulsions containing 60% water. Another test showed that bentonite clay subdivided into fundamental 1 nm layers and preconditioned by precipitation of polars (using the pentane precipitation method described above) added to the oil at a concentration of 4.7 g/L oil readily formed oil-external emulsions containing 60% water.

Figure 3:
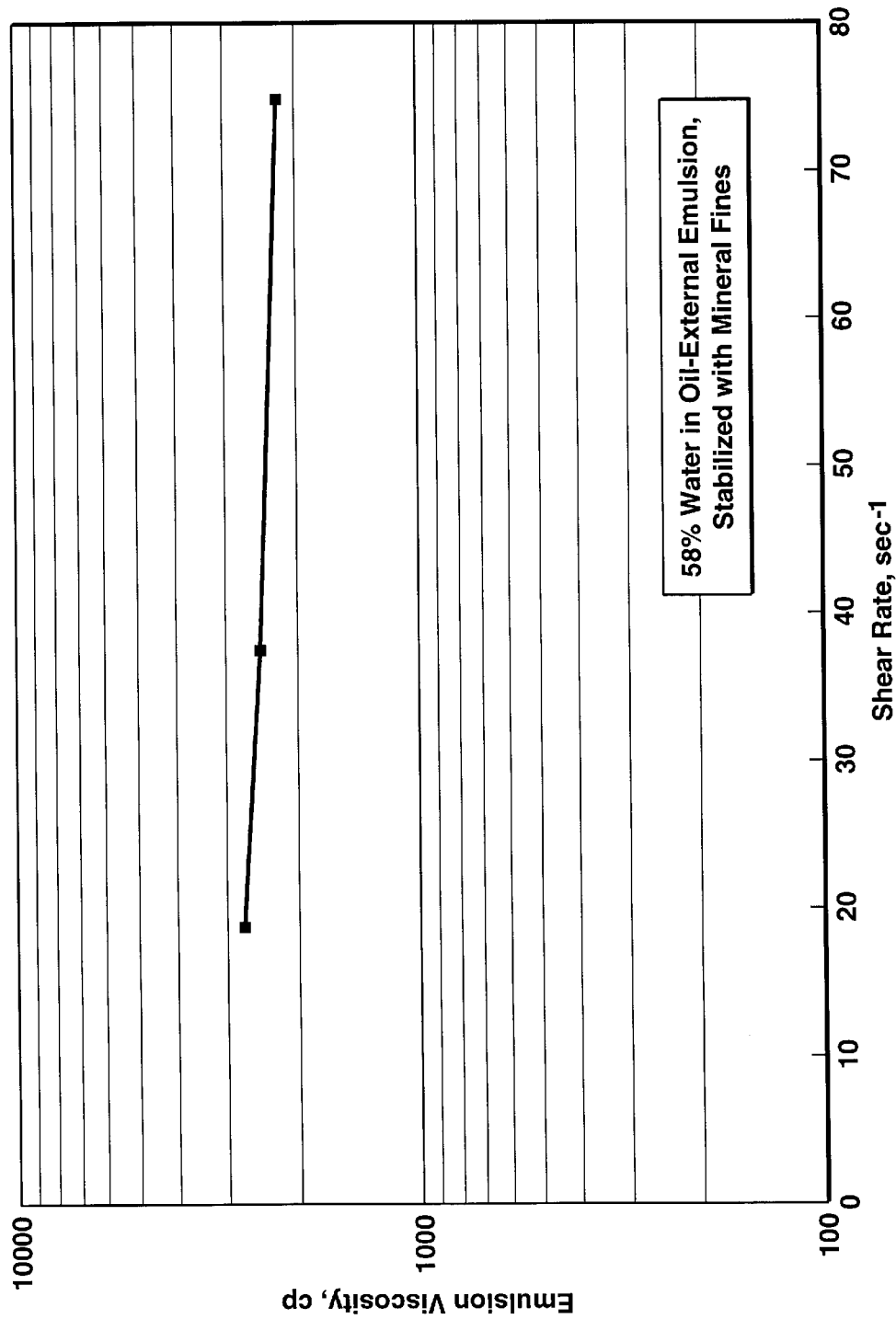
FIG. 3 illustrates a plot of the viscosity of a solids-stabilized emulsion with 58% water content by volume versus shear rate, in $sec^{-1}$.

To generate the emulsion tested in the core flood, approximately 400 cc of the crude oil with added "field mix" mineral fines was placed in a beaker with 600 cc of the brine shown in Table 1, and the mix was sheared until a uniform emulsion was formed in which all the water was emulsified inside an oil-external phase. About 5–10 minutes of shearing with a Silverson L4RT was sufficient. Observation of samples of the emulsion under a microscope showed that it contained stabilized water droplets ranging in diameter from approximately 1–30 microns or less. Droplets smaller than the visual resolution of the microscope may have been present but not detectable. Samples of the prepared emulsion were maintained in quiescent glass tubes at 140° F. for periods of from days to months to observe stability; no significant amount of excess water could be observed to separate, so the emulsions were stable. These emulsions also did not reject free water when subjected to centrifuging for 20 minutes at 1000 rpm and 10 minutes at 2000 rpm. FIG. 2 shows the viscosity of test emulsions at a shear rate of 75 $sec^{-1}$ versus water content. FIG. 3 shows the viscosity of the selected emulsion containing 58% water by volume versus shear rate.

To conduct the coreflood test, emulsion was pumped into the core at a rate of 0.213 ml/min. using a Ruska pump. Effluent from the core was collected in approximately 5 ml increments in test tubes contained in an automated fraction collector. Oil and water content in the each fraction was determined gravimetrically using an analytical procedure based on dilution of the sample with toluene to break any emulsion present, followed by separation of hydrocarbon and water phases. Samples of the oil and separated brine phases were analyzed by ion and electron capture chromatography to determine emulsion tracer concentrations for each incremental fraction of production. A concentration of 523 ppm of dichlorobenzene (DCB) in the oil phase of the emulsion and a concentration of 1000 ppm of bromide ion (from KBr) in the water phase of the emulsion were used as tracers. Table 3 summarizes pertinent data for the emulsion flood.

TABLE 3

Data for the Emulsion Flood

| Property | Value |
| --- | --- |
| Fraction of water in emulsion | 58% by volume |
| Flood injection rate | 0.215 ml/min. |
| Flood interstitial velocity | 97.5 cm/day (3.2 ft/day) |
| Oil viscosity at 140° F. | 325 cp |
| Brine viscosity at 140° F. | 0.485 cp |
| Oil density at 140° F. | 0.93 g/ml |
| Brine density at 140° F. | 1.018 g/ml |
| Emulsion viscosity @ $75^{-1}$ sec | 2200 cp |

Figure 4:
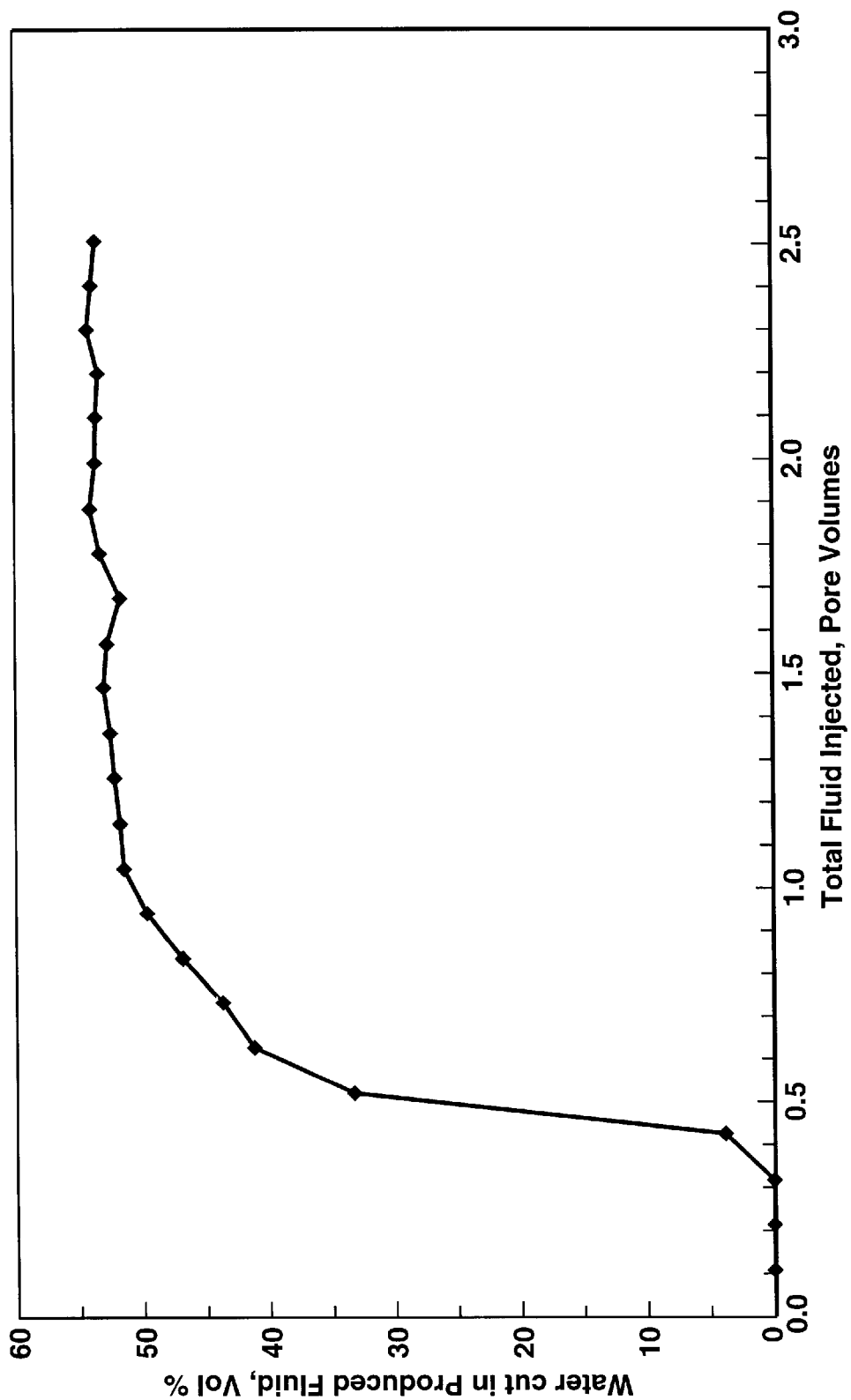
FIG. 4 illustrates a plot of water cut, in volume percent, in fluid produced from a laboratory core test versus total solids-stabilized emulsion injected, in pore volumes.
Figure 5:
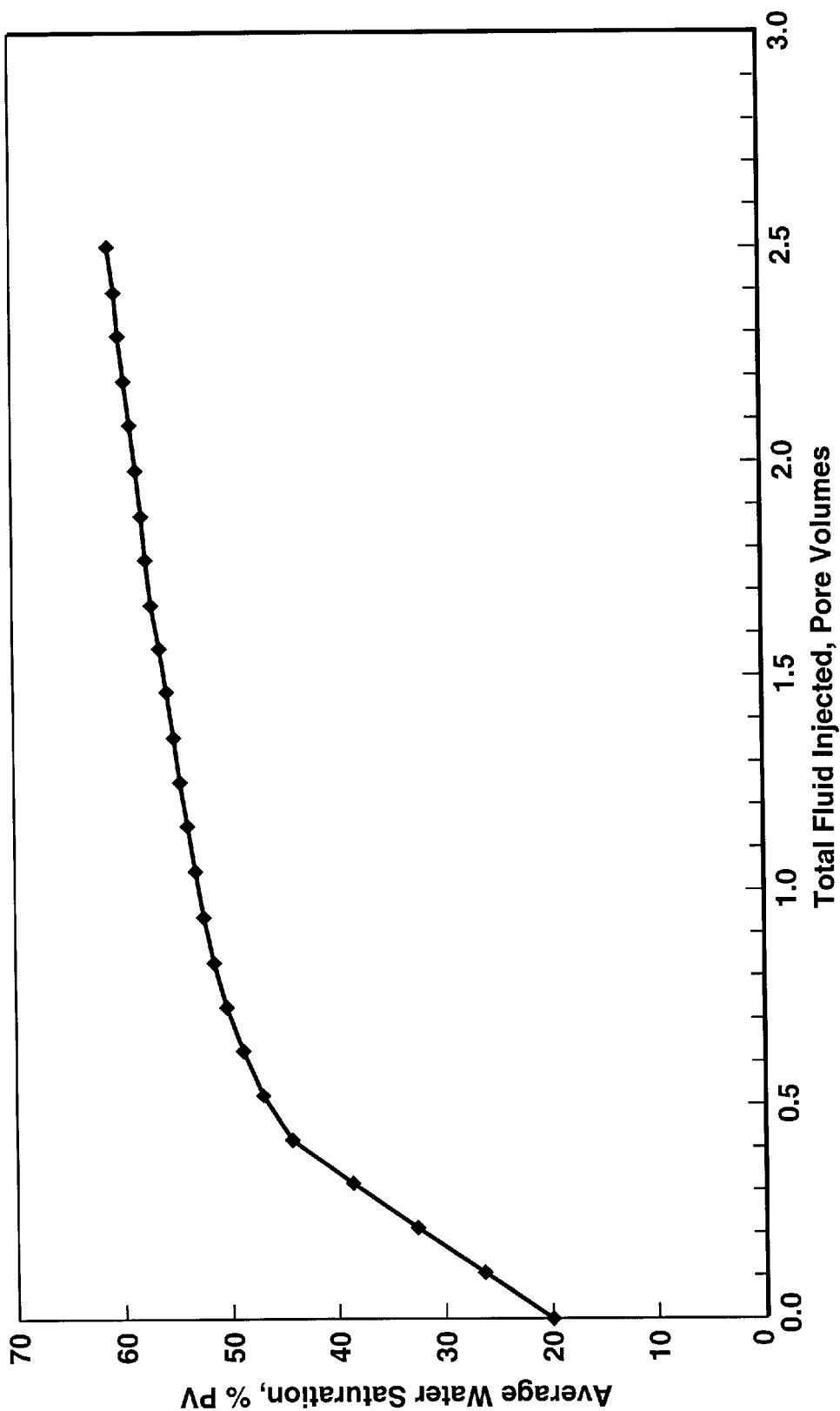
FIG. 5 illustrates a plot of the average water saturation, in percent pore volume, in a laboratory core test versus total volume of solids-stabilized emulsion injected, in pore volumes.
Figure 6:
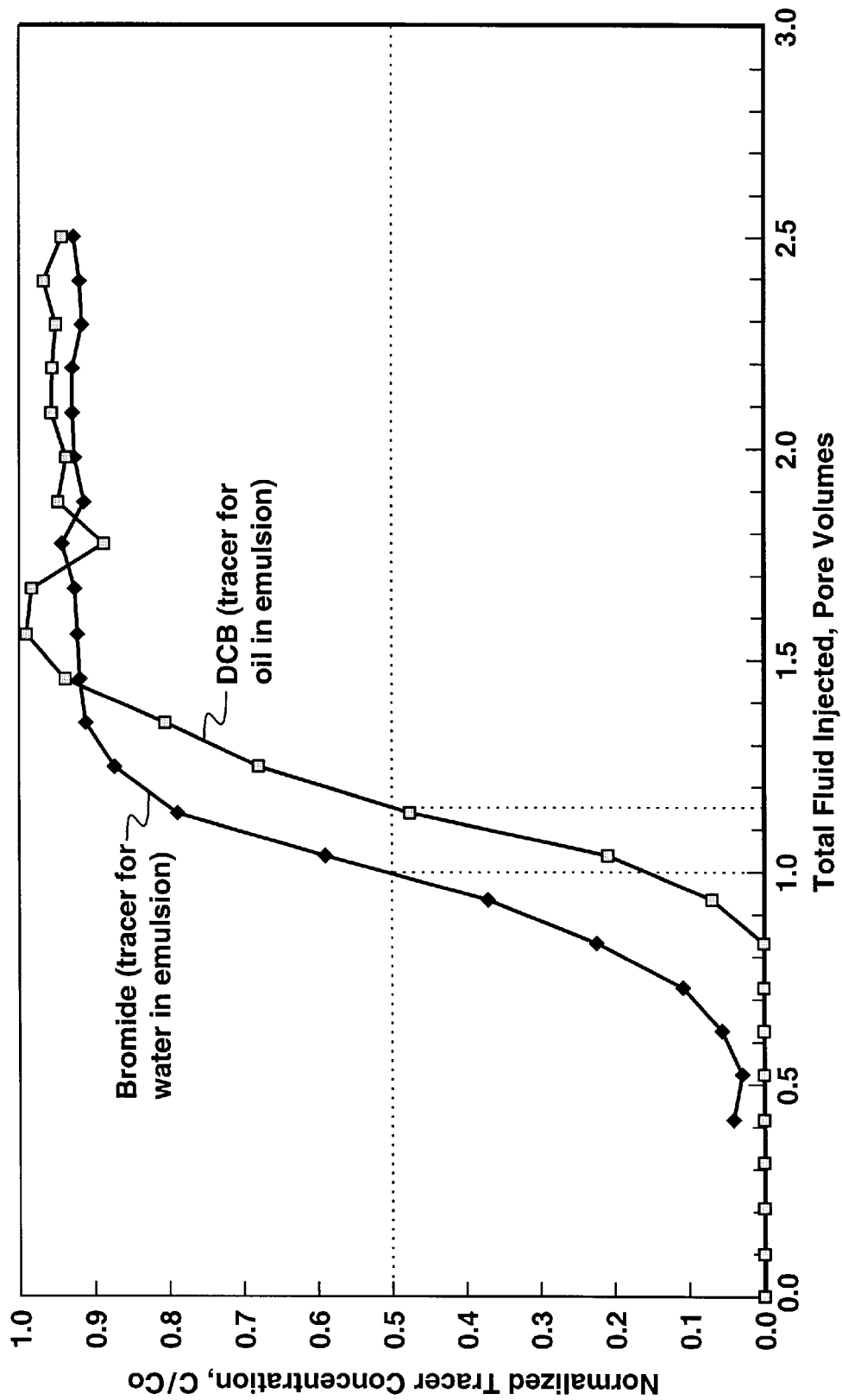
FIG. 6 illustrates a plot of concentration of two different tracers produced from a laboratory core test, bromide for tracing water that is a part of an injected solids-stabilized emulsion and dichlorobenzene for tracing oil that is part of an injected solids-stabilized emulsion versus total volume of solids-stabilized emulsion injected, in pore volumes.
Figure 7:
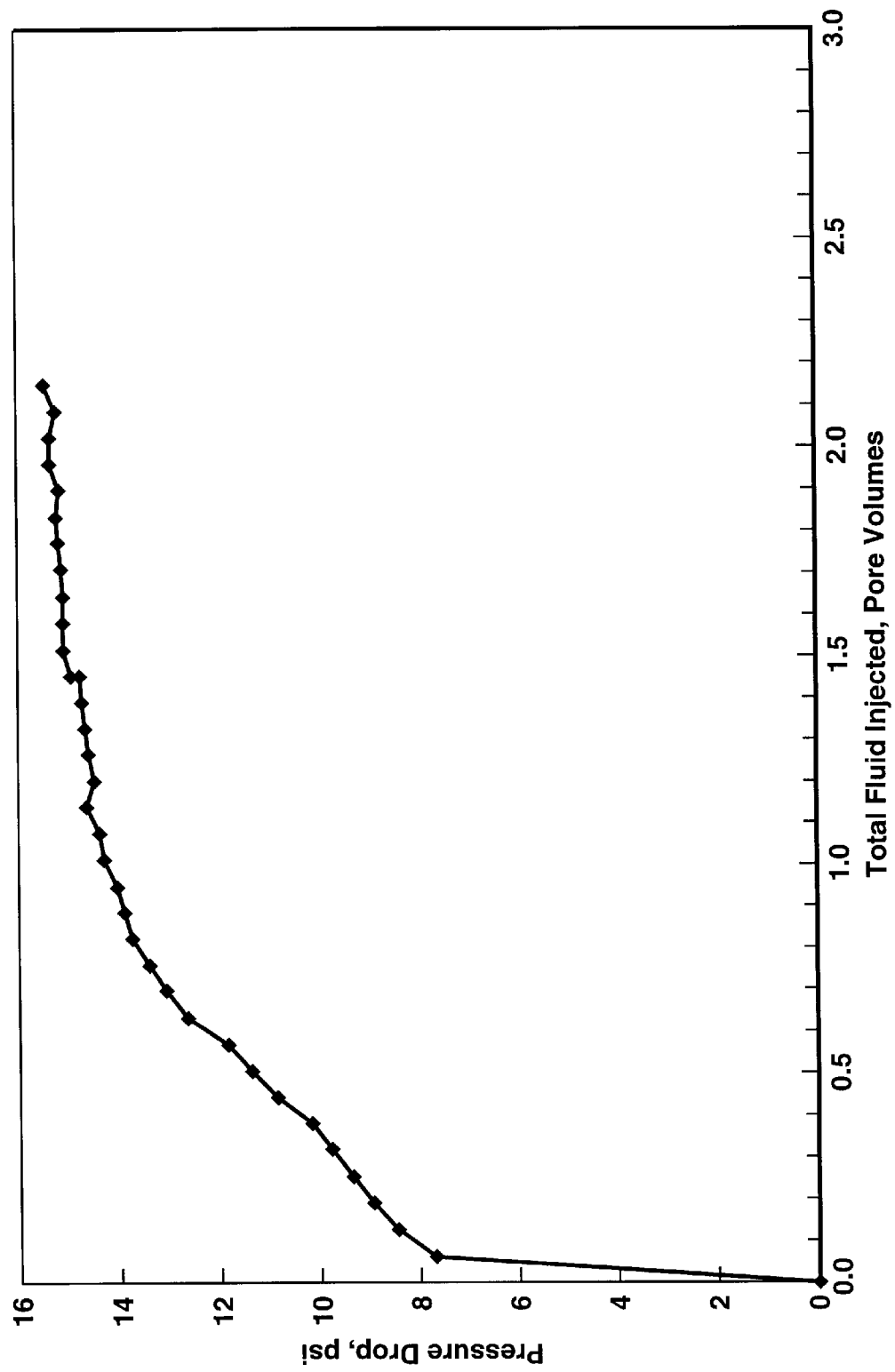
FIG. 7 illustrates a plot of pressure drop over a laboratory core test, in pounds per square inch, versus total volume of solids-stabilized emulsion injected, in pore volumes.

FIG. 4 shows the water cut in the fluid produced from the core as a function of total fluid (i.e., solids-stabilized emulsion) injected. FIG. 5 shows the average water saturation in the core versus volume of emulsion injected. FIG. 6 shows the ratio of tracer concentration in the core effluent, C, to the initial concentration of tracer in the emulsion when first injected into the core, $C_o$ (i.e., normalized tracer concentration), versus the total amount of emulsion fluid injected in the core, expressed in pore volumes. One plot represents the tracer concentration ratio for bromide in the water phase of the injected emulsion, while the second plot represents the tracer concentration ratio for dichlorobenzene ("DCB") in the oil phase of the injected emulsion. FIG. 7 shows the pressure drop across the core versus the total amount of emulsion fluid injected in the core, expressed in pore volumes. FIG. 6 indicates that a bromide tracer concentration of 0.5 was observed after 1.0 pore volume of emulsion was injected, while a tracer concentration of 0.5 was observed for the DCB at 1.17 pore volumes injected. Thus, on average, the water in the emulsion broke through after 1.0 pore volume injected, and oil in the emulsion broke through after 1.17 pore volumes injected. These tracer results and the corresponding pressure drop results in FIG. 7 indicate good emulsion stability and excellent mobility control with no trapping or loss of viscosity.

Figure 8:
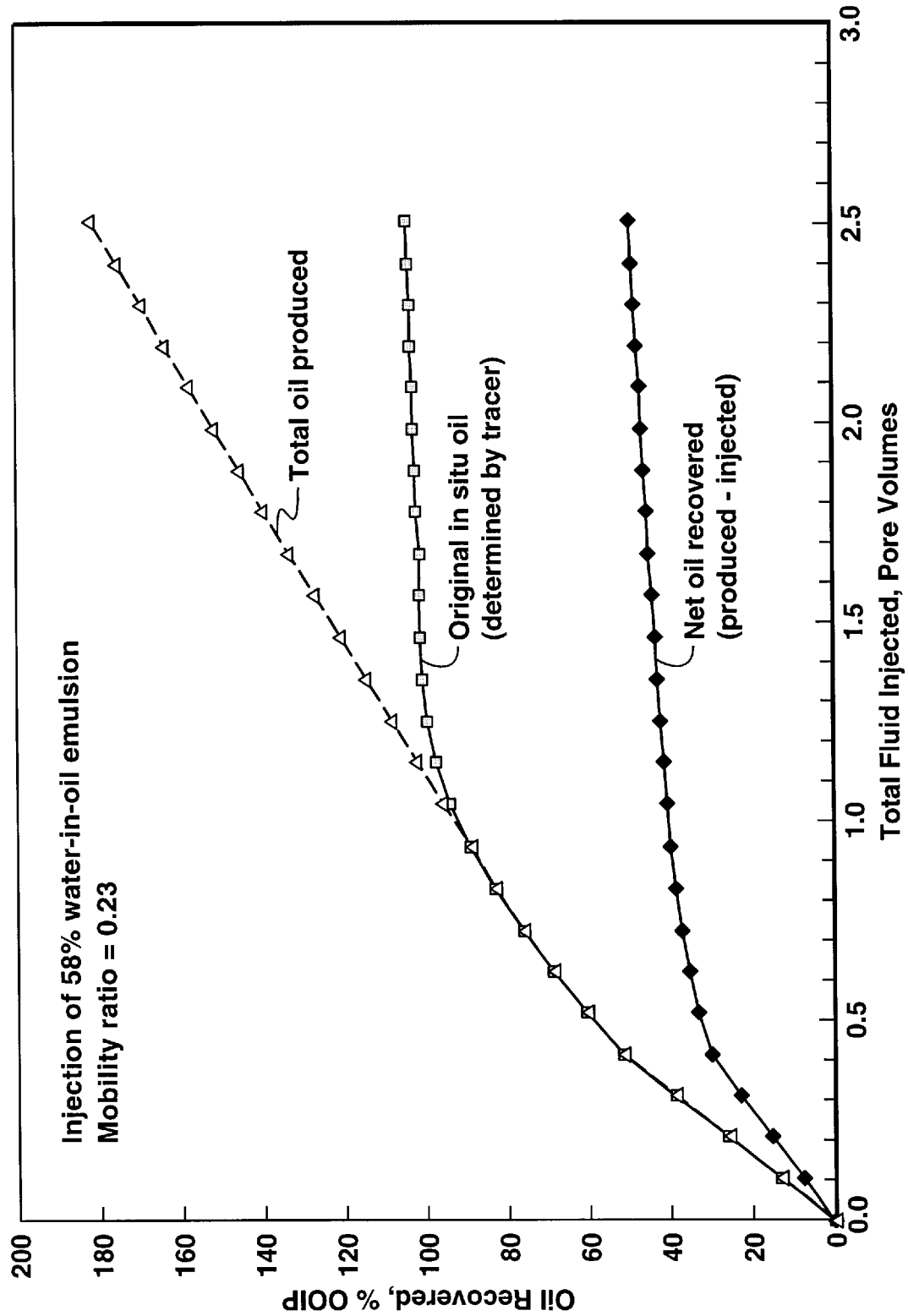
FIG. 8 illustrates a plot of three different measures of oil production from a laboratory core test as a percentage of original oil in place (OOIP) versus total volume of solids-stabilized emulsion injected, in pore volumes.

FIG. 8 provides three measures of oil production from the core. The "total oil produced" includes all oil produced. The curve identified as "original in situ oil" shows production of oil originally in the core prior to injection, as determined by the concentration of the emulsion oil tracer in the produced fluid. The net oil recovered is computed as the difference between the total oil produced less the amount of oil injected in the emulsion, and is of greatest interest in evaluating cost effectiveness of the process.

Net oil recovered at 1.0 pore volume injected is approximately 40% of the OOIP (oil originally in place). Waterflood oil recovery in similar cores for this oil ranged from 10.4% OOIP to 18.8% OOIP, so net oil recovery using the solids-stabilized emulsion was 2.1 to 3.8 times more effective. Displacement of the original oil in situ oil was almost complete even at only 1.0 pore volume injected, illustrating the effective mobility control achieved.

This test was conducted to demonstrate that the solids-stabilized water-in-oil emulsions move through the formation rock and efficiently displace the heavy oil. As indicated above, the tested solids-stabilized emulsion exhibited good emulsion stability and excellent mobility control under the laboratory simulated formation conditions. Further, while this laboratory evaluation oil recovery would be economic and much improved over waterflooding, the emulsion utilized in this flood was not optimized for oil recovery. Use of an emulsion with a water content of 80% would likely realize a net oil recovery of 70% of OOIP at 1.0 pore volume injected. Further, as apparent to those skilled in the art, the size of emulsion bank injected is a parameter that can be used to increase net oil recovery. For example, water could be injected after a 1.0 pore volume bank of emulsion, further increasing net oil recovery at 2.5 pore volumes total injection. The injected emulsion bank size and emulsion water content are parameters to be selected based on economic optimization for a specific field application.

The preferred embodiments of practicing the invention have been described. It should be understood that the foregoing is illustrative only and that other means and techniques can be employed without departing from the true scope of the invention claimed herein.

What I claim is:

1. A solids-stabilized emulsion for use in recovering hydrocarbons from a subterranean formation, said emulsion comprising:
   (a) a first liquid;
   (b) droplets of a second liquid suspended in said first liquid;
   (c) solid particles which are insoluble in both said first liquid and said second liquid at the conditions of said subterranean formation; and
   (d) a sufficient amount of a gas to reduce the viscosity of said solids-stabilized emulsion to less than about ten times the viscosity of said hydrocarbons.

2. The solids-stabilized emulsion of claim 1, wherein said solids-stabilized emulsion contains sufficient gas to increase the mobility of said solids-stabilized emulsion to a point approximately equal to, but not greater than, the mobility of said hydrocarbons.

3. The solids-stabilized emulsion of claim 1, wherein said gas is a hydrocarbon gas.

4. The solids-stabilized emulsion of claim 1, wherein said gas is carbon dioxide.

5. The solids-stabilized emulsion of claim 1, wherein said first liquid is oil, said second liquid is water, and said solid particles are at least partially oleophilic.

6. The solids-stabilized emulsion of claim 5, wherein water comprises at least sixty volume percent of said solids-stabilized emulsion.

7. The solids-stabilized emulsion of claim 1, wherein said first liquid is water, said second liquid is oil, and said solid particles are at least partially hydrophilic.

8. The solids-stabilized emulsion of claim 1, wherein said solid particles are selected from the group consisting of clays, quartz, feldspar, gypsum, coal dust, asphaltenes, and polymers.

9. The solids-stabilized emulsion of claim 1, wherein said solid particles comprise fundamental particles of bentonite clays.

10. The solids-stabilized emulsion of claim 1, wherein said solid particles comprise particles of kaolinite clays.

11. The solids-stabilized emulsion of claim 1, wherein said solid particles comprise fumed silica.

12. The solids-stabilized emulsion of claim 1, wherein said solid particles have an average particle size of less than about 10 microns.

13. A method for making an emulsion for use in recovering hydrocarbons from a subterranean formation, said method comprising the steps of:
   (a) selecting a first liquid and a second liquid for use in said emulsion;
   (b) selecting a type of solid particles to be used to stabilize said emulsion, said solid particles being insoluble in both said first liquid and said second liquid at the conditions of said subterranean formation;
   (c) creating a mixture of said first liquid, said second liquid, and said solid particles;
   (d) shearing said mixture to produce an emulsion of droplets of said second liquid suspended in said first liquid, wherein said solid particles stabilize said emulsion by preventing coalescence of said droplets of said second liquid; and
   (e) adding a sufficient amount of a gas to said mixture to reduce the viscosity of said emulsion to less than about ten times the viscosity of said hydrocarbons.

14. The method of claim 13, wherein said gas is added to said mixture prior to said step of shearing said mixture.

15. The method of claim 13, wherein said gas is added to said mixture after said step of shearing said mixture.

* * * * *